No. 888,419. PATENTED MAY 19, 1908.
WILLIAM W. BURSON & WILSON. W. BURSON.
MACHINE FOR DESTROYING THE COTTON BOLL WEEVIL.
APPLICATION FILED JAN. 25, 1904.
2 SHEETS—SHEET 1.
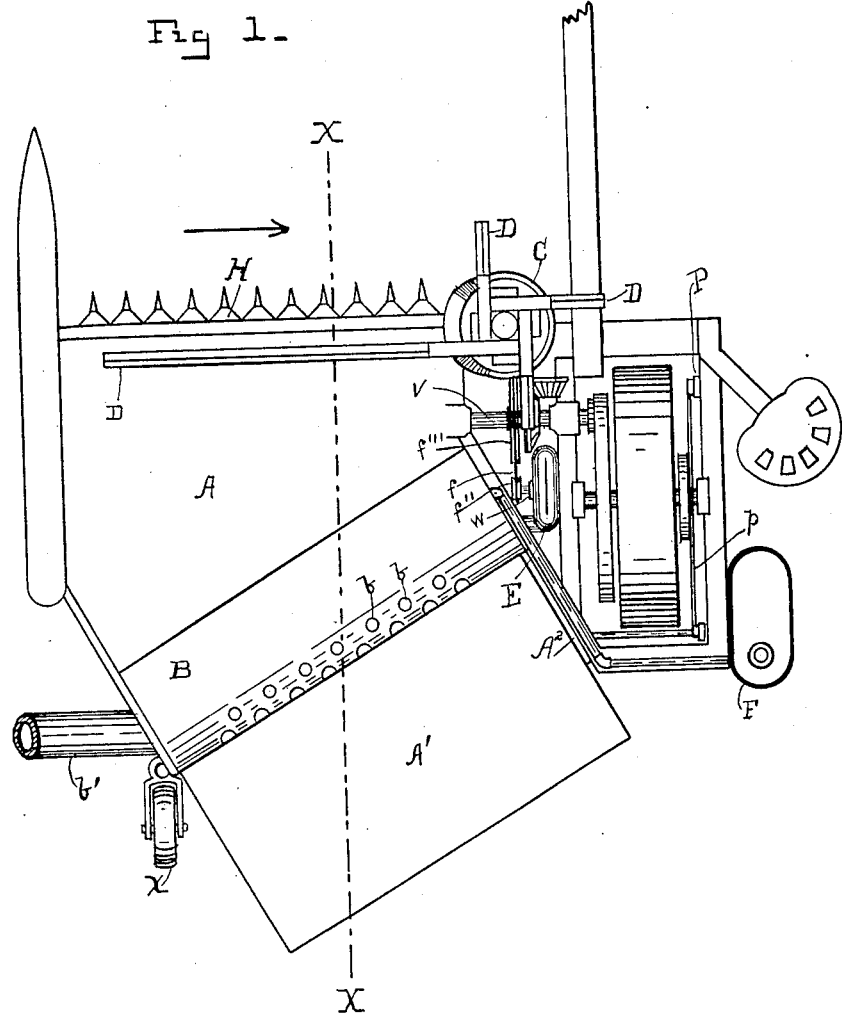
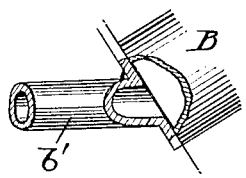

No. 888,419. PATENTED MAY 19, 1908.
WILLIAM W. BURSON & WILSON W. BURSON.
MACHINE FOR DESTROYING THE COTTON BOLL WEEVIL.
APPLICATION FILED JAN. 25, 1904.
2 SHEETS—SHEET 2.
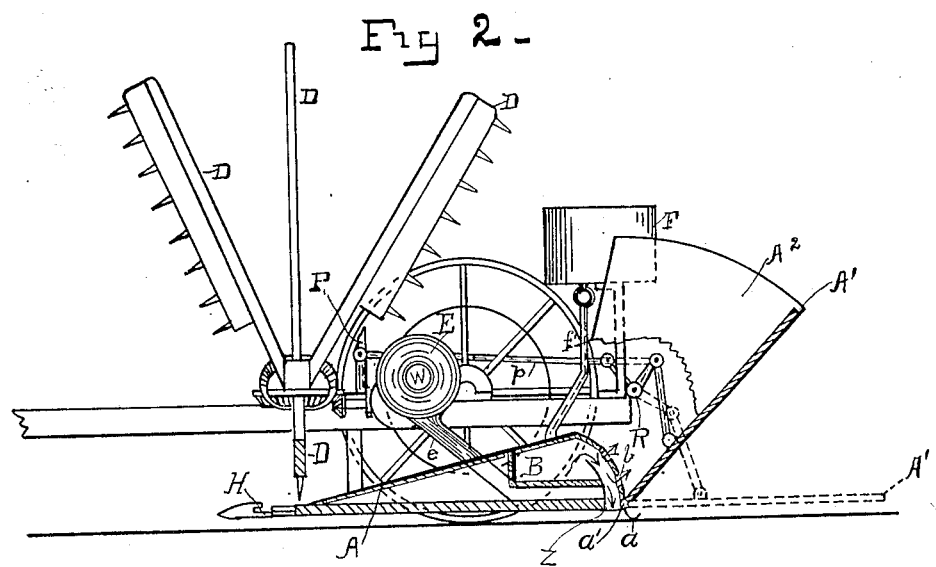
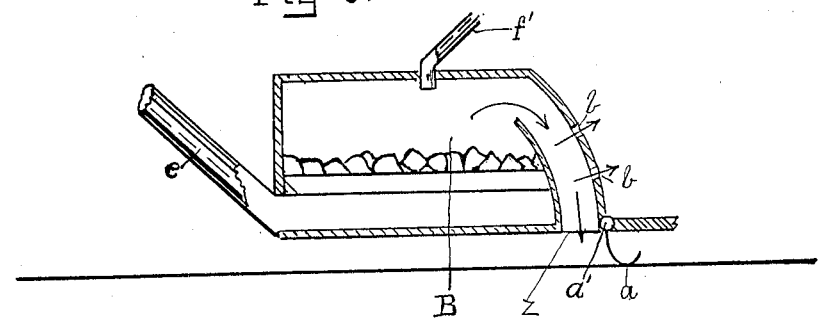

UNITED STATES PATENT OFFICE.

WILLIAM WORTH BURSON, OF CHICAGO, AND WILSON WORTH BURSON, OF ROCKFORD, ILLINOIS.

MACHINE FOR DESTROYING THE COTTON BOLL-WEEVIL.

No. 888,419.  Specification of Letters Patent.  Patented May 19, 1908.

Application filed January 25, 1904. Serial No. 190,486.

*To all whom it may concern:*

Be it known that we, WILLIAM WORTH BURSON, of Chicago, in the county of Cook, and WILSON WORTH BURSON, of Rockford, in the county of Winnebago, both of the State of Illinois, have invented a new and useful Machine for Destroying the Cotton Boll-Weevil, of which the following is a specification.

Our invention relates to improvements in the appliances for destroying the Mexican cotton boll weevil, and the objects of our invention are: first, to gather the cotton stalks from the ground, preferably immediately after the last picking: second, to subject the stalks to the action of heat, either flame or steam, in their passage to a receptacle at the rear of the machine: third, to subject the stalks, while being carried forward, to the action of heat to the extent of destroying all the weevils and their eggs which are on or within the stalks: fourth, to drop these heated bunches on the ground, outside the passage of the team in its next round, in windrows, whereby they may be entirely burned when sufficiently dry: fifth, to subject the entire surface of the field to the destructive action of the heat whereby all the weevil on the ground, or in hiding in fallen bolls or squares, shall be killed in the process of gathering the cotton stalks: sixth, to provide means whereby the border of the field outside the travel of the machine may be subjected to the destructive action of heat.

One plan by which we attain these objects is shown by the mechanism illustrated in the accompanying drawings, in which Figure 1 is a plan view, certain parts being omitted to better show others. Fig. 2 shows an elevation partly in section on line $x\ x$ of Fig. 1 looking in the direction of the arrow. Fig. 3 is an enlarged view of the fire box shown in Fig. 2. Fig. 4 is a section showing the connection of the tube $b'$ with the fire box.

Similar characters of reference refer to similar parts throughout the several views.

In one form of our invention for the purpose of gathering the cotton stalks from the ground we show a modified form of the well known grain reaper, making only such changes as are required to do our work, and it is not thought necessary to show the mechanism operating the cutting device adapted to cut cotton stalks or gathering rake arms in detail, these being well known. The carry wheels need not differ from the ordinary reaper, except that the caster wheel X is preferably used, attached to the rear of the platform enabling a "full tongue" to be used, Fig. 1.

The stalk receiving platform A is inclined upward at the rear end, so as to pass over the fire box B: the rake controlling cam C is adapted to guide the rake arms D, D, D, D, over the platform A which is inclined upward so as to pass over the fire box, and to deliver the stalks into the receptacle formed by the controllable table A' and the fixed end A² which is located adjacent to one end of the table A'.

The fire box B is preferably made long enough to cover a space equal to the width of cut of the machine and is here shown as fitted to use wood or coal with some oil preferably added. The fan E is driven by the belt $f$ on pulleys $f'''$ and $f''''$ placed respectively on the fan shaft W and rake driving shaft V and forces a blast of air through pipe $e$ into fire box B, driving the heat and flame through the openings $b\ b$ outward and upward, and to the ground at the rear underside of the fire box.

The hinged cover $a$ pivoted to $a'$ serves to hold the heat close to the ground and adds to its effectiveness in burning the weevil, their eggs and larvæ. The end A² to the stalk receptacle serves to retain a portion of the heat of the stalks and also to protect the driver somewhat from the heat of the burning stalks.

The table A' is conveniently raised and lowered by the driver on the seat by moving lever P, connected by pitman $p$ with rock-shaft R having a link connection with the table.

The oil tank F is conveniently placed above the fan and the pipe $f''$ conducts the oil to the fire box where the pipe is perforated so as to deliver the oil upon the burning fuel in such amounts as is desired. When the wood, or other fuel, gives sufficient heat no oil need be used, but we prefer to provide for its use if wanted. Oil fuel alone may be used with a proper burner.

In operation, the machine is drawn along the stalk rows which are cut by the cutting apparatus H and moved by the rake heads along the platform and over the fire box whereby all parts of the stalks are brought into contact with heat and flame and all the dry parts are ignited and thrown by the rakes into the receptacle formed by the table A, and fixed end A², into which the flame and heat from the fire box are drawn and the burning mass is carried until such amount as is thought best has accumulated when the bunch is dumped on the ground, preferably in windrows, by dropping table A where, when sufficiently dry, all are carefully burned. While this process is going on the heat and flame are driven downward upon the ground through the opening Z whereby all the dry material is fired and all the weevil, their eggs, and larvæ, destroyed. It is desirable to "fire" the borders of the field as well as all portions of the field and this is done by directing a stream of flame from the fire box out through the tube b' which is located transverse of the machine and has a communication with the end of the fire box.

We do not wish to confine ourselves to the exact mechanism here shown as many changes may be made without departing from the scope of our invention.

We claim as our invention.

1. In a weevil destroying machine, the combination of a platform, stalk cutting and gathering mechanism, means for carrying the stalks over the platform, and a heating apparatus arranged to deliver heat to the stalks on the platform.

2. In a weevil destroying machine, the combination of a platform, stalk cutting and gathering mechanism, means for carrying the stalks over the platform, and a heating apparatus having discharge openings located across the platform over which the stalks are carried.

3. In a weevil destroying machine, the combination of a platform, stalk cutting and gathering mechanism, means for carrying the stalks over the platform, and a heating apparatus having discharge openings located across the platform over which the stalks are carried, and having discharge openings to direct the heat on the ground.

4. In a weevil destroying machine, the combination of a platform, a movable rear end to the platform, stalk cutting and gathering mechanism, means for carrying the stalks over the platform, and a heating apparatus arranged to deliver heat to the stalks on the platform.

5. In a weevil destroying machine, the combination of a platform, a stationary end and a movable table to the platform, stalk cutting and gathering mechanism, means for carrying the stalks over the platform, and a heating apparatus arranged to deliver heat to the stalks on the platform.

6. In a weevil destroying machine, the combination of a platform, stalk cutting and gathering mechanism, means for carrying the stalks over the platform, and a heating apparatus having discharge openings to direct the heat on the ground.

7. In a weevil destroying machine, the combination of a platform, a receptacle, stalk cutting and gathering mechanism, means for carrying the stalks over the platform into the receptacle, and a heating apparatus arranged to deliver heat to the stalks in the receptacle.

8. In a weevil destroying machine, the combination of a platform, stalk cutting and gathering mechanism, means for carrying the stalks over the platform, a heating apparatus arranged to deliver heat to the stalks, and to deliver heat to one side of the machine.

In testimony whereof we have signed our names to this specification in the presence of two subscribing witnesses.

WILLIAM WORTH BURSON.
WILSON WORTH BURSON.

Witnesses:
C. W. HOYT,
S. C. TRUFANT.